(12) United States Patent
Shah et al.

(10) Patent No.: US 11,537,474 B2
(45) Date of Patent: Dec. 27, 2022

(54) RECOVERY OF A SOFTWARE-DEFINED DATA CENTER FROM PERSISTENT ENTITY STORES FOR VIRTUAL MACHINES

(71) Applicant: VMware, Inc., Palo Alto, CA (US)

(72) Inventors: Alkesh Shah, Palo Alto, CA (US); Maarten Wiggers, Mountain View, CA (US); Cheng Cheng, Palo Alto, CA (US); Leonid Livshin, Boston, MA (US); Konstantinos Roussos, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 535 days.

(21) Appl. No.: 16/458,473

(22) Filed: Jul. 1, 2019

(65) Prior Publication Data

US 2021/0004293 A1 Jan. 7, 2021

(51) Int. Cl.
*G06F 11/14* (2006.01)
*G06F 9/455* (2018.01)

(52) U.S. Cl.
CPC ...... *G06F 11/1448* (2013.01); *G06F 9/45558* (2013.01); *G06F 11/1469* (2013.01); *G06F 11/1484* (2013.01); *G06F 2009/4557* (2013.01)

(58) Field of Classification Search
CPC ............. G06F 11/1448; G06F 11/1484; G06F 11/1469; G06F 2009/4557; G06F 9/45558; G06F 9/45562; G06F 9/4557; G06F 9/45575
See application file for complete search history.

(56) References Cited

U.S. PATENT DOCUMENTS

| | | | |
|---|---|---|---|
| 8,498,967 B1 | 7/2013 | Chatterjee | |
| 10,168,949 B1* | 1/2019 | Abdul Rasheed | .... G06F 3/0664 |
| 10,310,949 B1* | 6/2019 | Chakraborty | ......... G06F 3/0683 |
| 2008/0134177 A1* | 6/2008 | Fitzgerald | ............ G06F 21/577 |
| | | | 718/1 |
| 2011/0173303 A1* | 7/2011 | Rider | ................ G06F 9/44505 |
| | | | 709/220 |
| 2016/0292074 A1* | 10/2016 | Awasthi | .............. G06F 9/45558 |
| 2016/0320978 A1* | 11/2016 | Barve | .................... G06F 3/0619 |
| 2016/0328222 A1* | 11/2016 | Arumugam | ............... G06F 8/71 |
| 2017/0060707 A1* | 3/2017 | Harper | ............... G06F 11/2025 |
| 2017/0139782 A1* | 5/2017 | Chen | ....................... G06F 16/27 |
| 2019/0026194 A1* | 1/2019 | Bachu | ................ G06F 11/1451 |
| 2019/0108099 A1* | 4/2019 | Mazumdar | .......... G06F 11/2043 |
| 2020/0074125 A1 | 3/2020 | Rein | |
| 2020/0167238 A1* | 5/2020 | Killamsetti | ......... G06F 11/1461 |
| 2020/0311033 A1* | 10/2020 | Roberson, II | ......... G06F 16/182 |
| 2020/0341787 A1* | 10/2020 | Tiwari | ............... G06F 11/1484 |

* cited by examiner

*Primary Examiner* — Joseph O Schell
(74) *Attorney, Agent, or Firm* — Clayton, McKay & Bailey, PC (57) ABSTRACT

Examples described herein include systems and methods for backing up and recovering a software-defined data center ("SDDC"). In one example, entities of the SDDC, such as virtual machines, hosts, and clusters, can coexist with corresponding entity stores. The entity stores can store current state information for each SDDC entity. For example, an identifier or name of a virtual machine can be stored in that virtual machine's corresponding entity store. When recovery of a controller is needed, the controller can rebuild state information that has changed after the controller was backed up, by retrieving state information from entity stores of the various SDDC entities.

17 Claims, 8 Drawing Sheets

RECOVERY OF A SOFTWARE-DEFINED DATA CENTER FROM PERSISTENT ENTITY STORES FOR VIRTUAL MACHINES

BACKGROUND

In a software-defined data center ("SDDC"), infrastructure elements are virtualized and delivered as a service. Networking, storage, processing, and security functions can execute as virtualized components on top of physical hardware devices, such as servers. An SDDC can span one or more clouds. By virtualizing aspects of a regular data center, an SDDC can allow for easier and more flexible deployments that scale according to company or client needs.

As with traditional data centers, SDDCs require backup and restoration strategies to guard against failures and provide reliable uninterrupted service. Backup and restore operations in an SDDC can involve additional challenges compared to conventional data centers. In a conventional data center, a backup server is usually coupled to a primary server such that upon failure of the primary server, the backup server takes over the operations of the primary server without significant interruption of service. Customers expect similar backup reliability from an SDDC, such as by providing a backup copy of the SDDC.

However, because an SDDC is comprised of virtual components that constantly change states, backing up and restoring an SDDC is not so simple. Virtual components, such as virtual machines ("VMs") and microservices, change states as they operate. Additionally, the virtual components can be moved to different physical devices to meet various SDDC demands. One or more virtualized controllers track the states of the virtual components, including identity and location, so that clients can communicate with the various virtual components of the SDDC as needed. If the controller itself fails, simply restarting the controller may not be enough to restore the SDDC since the other virtual components may change state and become unreachable by the controller.

In more detail, recovery can also require restarting virtual components at particular physical devices or locations. Additionally, to achieve the corrects states, virtual components often need to be restored in a particular order. Again, this becomes especially problematic when the controller itself crashes or becomes unstable. Normally, the controller manages and backs up the states of the various virtual components. When the controller itself needs to be restored, it may not know the most recent collection of the virtual components, their states, or their locations.

Consequently, a need exists for systems and methods that backup and recover an SDDC.

SUMMARY

Examples described herein include systems and methods for backing up and recovering an SDDC. Various components of an SDDC, such as VMs, containerized microservices, and hosts, can persist with respective entity stores. The entity stores can be instantiated with the SDDC component and co-exist at a physical device where the SDDC component executes. Likewise, when an SDDC component is decommissioned or deleted, the corresponding entity store can be decommissioned or deleted. The entity store can store state information about the SDDC component to which it relates. The state information can include any information that describes the SDDC component, such as an operational state, an identifier, a name, or some other descriptor. As used herein, the "state information" can be referred to as the "state" for convenience.

An example method includes changing, by a controller of the SDDC, a state of a VM. The controller can, for example, update a name or identifier of the VM. This can include updating an entity store that persists with the VM to reflect the new state, such as a new name. Similar updating can be done for other SDDC component types as well, such as hosts or microservices, when those SDDC components have a state change. This can allow state information to persist in a distributed manner throughout the SDDC, rather than just at the controller. The controller can keep its own copy of relevant state information in a controller database, allowing the controller to route requests to appropriate SDDC components. The state information in the controller database can also be useful for restoring the SDDC, including when the controller itself fails, in an example.

Upon a failure of the controller, the SDDC can be restored by restarting the controller and restoring the controller state information from a backup record. The backup record can be, for example, a controller database. The backup record was created prior to changing the state of the VM. As a result, a current state of the VM may not be reflected in the backup record.

To ensure correctness of the controller states, the controller can request state information from the VM. This can include sending a call to a host that runs the VM. The host can include an agent that negotiates with the VM or directly with the respective entity store of the VM. The controller can then receive the state information from the entity store. This can be sent from the VM or from the host back to the controller. The controller can then update the controller database to reflect the state of the virtual machine.

The method can be performed as part of a system to backup and restore an SDDC, in an example. This can include executing, by a processor, instructions in a non-transitory, computer-readable medium to carry out the various stages.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts. Certain words that are used in this disclosure can have various equivalencies and are not intended to be limiting or exclusionary. Examples described herein include systems and methods for backing up an SDDC. Services provided by an SDDC can include the ability to run a workload (computation), persist data (storage), and output results of the computation. Various virtualized components can carry out these tasks within the SDDC. To restore the SDDC, the states of these virtualized components can be restored at the controller based on techniques discussed below.

In one example, entity stores are created for virtual components (also called objects) in the SDDC. For example, when a VM is instantiated, a corresponding entity store is created. The entity store for each object can be updated before changing the state of the object. For example, a controller can send a command to a VM or host to change the VM state. The host or VM can cause the corresponding entity store to update the ID value in the entity store, then causing the VM to update its ID value. An entity store can also be created for a cluster and distributed and maintained across the hosts within the cluster. For example, the distributed entity store can contain a list of host IDs that belong to the cluster.

If a failure occurs within the SDDC that impacts the controller, the controller can be restored first from backup records of the controller state prior to failure. This can include restarting the controller and using the last version of the controller database. Then, the controller can request state information from one or more virtual machines, which can return their states from the corresponding entity stores. In one example, the controller requests state information from a host, which provides a list of virtual machines on the host. The host can also access a distributed cluster store and provide a list of other hosts. The controller can traverse each VM in each host, receiving updated state information from each VM's corresponding entity store. This can ensure the controller is restored with the latest state information for all of the VMs and other components in the SDDC.

Figure 1:
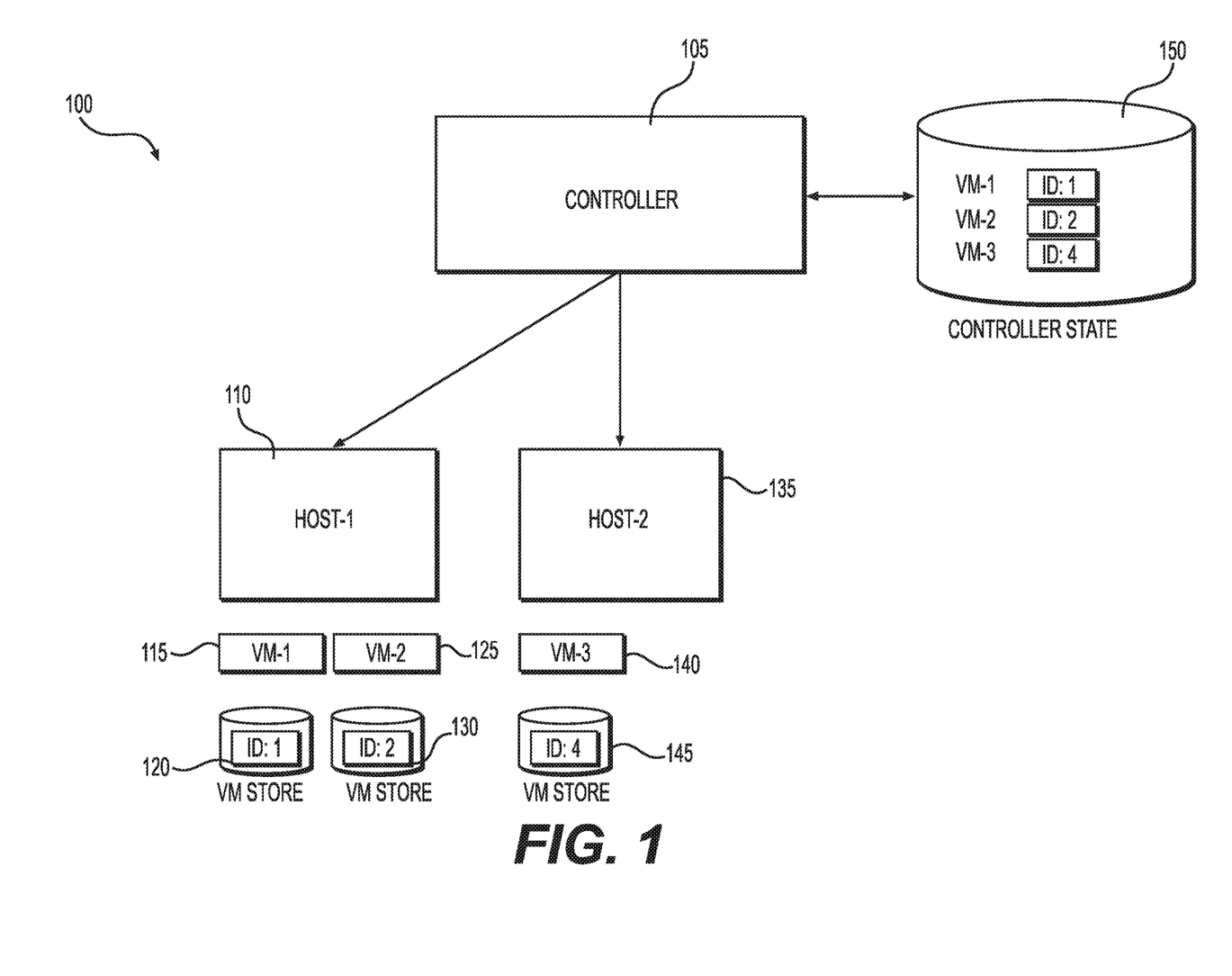
FIG. 1 is an illustration of example system components for backing up and restoring an SDDC.

FIG. 1 is an illustration of an example system 100 that offers backup and recovery services in an SDDC. The example system 100 can include a controller 105 that is communicatively coupled to a first host 110 and a second host 135. The controller 105 can be software running on physical hardware, such as server with a processor. A single SDDC can include multiple controllers 105, each responsible for different virtual components of the SDDC. For example, the SDDC architecture can include a data plane that communicates with controllers 105 for compute, storage, and networking. The controllers 105 can manage hosts and VMs associated with these functions, in an example.

Each of the elements of the system 100 can be implemented in hardware, software, or a combination of hardware and software and are collectively configured to operate as an SDDC. Hosts can be virtual components of the SDDC as well, in an example. Alternatively, a host can represent a physical device upon which other virtual components of the SDDC execute. Therefore, a host can exist in a physical or virtual layer of the SDDC, depending on the example. The agent, in turn, can run in either the physical or virtual layer of the SDDC, depending on the example.

In one example, the controller 105, the first host 110, and the second host 135 are co-located in a physical facility that provides SDDC services and communicatively interconnected via a local area network. In another example, the controller 105, the first host 110, and the second host 135 host can be located in different physical locations and communicatively interconnected via a wide area network such as the internet or a Telco network. The controller 105 and hosts 110, 135 can be virtualized. Alternatively, hosts 110, 135 can represent physical hardware on which various VMs 115, 125, 140 can run.

The hardware portion of the first host 110 can include a processor and a memory. The memory can be implemented in various ways such as in the form of one or more memory devices mounted upon a printed circuit board located in the first host 110 or in the form of a distributed architecture that can include cloud storage components. The processor can access the memory to execute instructions stored in the memory for implementing various operations of an SDDC node in the host computer 105.

The controller 105 can be responsible for managing the VMs 115, 125, 140 in the SDDC. This can include creating the VMs 115, 125, 140 on appropriate hosts 110, 135. The controller can also change state of the VMs 115, 125, 140. States can represent any information describing the VM, such as an identity for the VM. The controller 105 tracks the identity of each VM in the SDDC so that client requests can be sent to the correct VM. When an identity or other VM state is changed, or at some other event or period, the controller 105 can store the new state in a controller database 150. The controller database 150 can be a database that represents the current state of the SDDC, in an example. It can be utilized as a back-up database or itself backed up periodically, but in either event the backup may not represent every correct VM state as time passes from the most recent backup. In existing SDDC recovery technologies, restoring inaccurate state information, such as an incorrect VM identity, can have several consequences. For example, the controller clients attempting to use an incorrect VM identity can get "not found" errors, potentially forcing the client to re-discover the VM. Therefore, it is very beneficial to recover states of the VM, such as the correct VM identity, along with the VM itself.

To track states, an entity store can be created for any virtual component in the SDDC. The entity store can track states of the corresponding virtual component so that the controller 105 can rebuild correct states in the controller database 150 for all virtual components of the SDDC. The controller database 150 can be any type of storage accessed by the controller 105, such as virtual controller store that stores controller states. Controller states can comprise states collected from the various virtual components, allowing the controller 105 to identify and contact those components. Example virtual components with entity stores can include VMs, hosts, and clusters. For example, the controller 105 or first VM 115 can create a first entity store 120 as part of creating the first VM 115. The first entity store 120 can co-exist with the first VM 115 and track the current states of the first VM 115, such as its identity, operational state, or location. In the example of FIG. 1, the identifier ("ID") is of VM 115 is 1. The controller 105 can also store this information in the controller database 150.

Similar entity stores 130, 145 can be created and maintained for respective VMs 125, 140. Though not pictured in FIG. 1, entity stores can also be created for the first host 110 and second host 135. Among other things, the entity store for a host can track which VMs are running on that host. During recovery, this can allow the controller 105 to ensure it has the most up-to-date list of VMs for a particular host. This can allow the controller 105 to retrieve states from those VMs.

In this example, the data stored in the controller database 150 can reflect states of the various virtual components, including VMs 115, 125, 140, hosts 110, 135, and clusters to which the hosts belong. However, these states may not be up to date compared to the states of the entity stores. For this reason, restoring the controller 105 can include retrieving one or more states from the entity stores.

A few examples of states can include an ID of the first VM 115, an ID of a software segment in the first VM 115, an ID of an object that is managed by the first VM 115, and a version number of the first VM 115. The states can also reflect operating states of the corresponding virtual component, such as VM 115 or host 110. An example operating state of the first VM 115 can include a configuration of the first VM 115 when executing a particular SDDC operation. In one example, this operating state is not shared with other VMs.

A life cycle of the first entity store 120 can be tied to a life cycle of the first VM 115. Consequently, the first entity store 120 only persists while the first VM 115 exists, in an example. Furthermore, the first entity store 120 is configured to move along with the first VM 115 if the first VM 115 is moved. In one exemplary implementation, an entity ID tag is attached to the first entity store 120 for identifying the first entity store 120. The entity ID tag can be used by another host when the first entity store 120 is moved from the first host 110 to the other host. The entity ID tag and the first entity store 120 can be stored in a file when moved from the first host 110 to the other host. The entity ID tag as well as any other form of identification that is associated with the first entity store 120 is neither re-used nor duplicated so as to avoid improper usage of the first entity store 120 during restoration procedures after a failure of the controller 105 for example.

In the example of FIG. 1, the second entity store 130 can store one or more states of the second VM 125. An example operating state of the second VM 125 can include a configuration of the second VM 125 when executing a particular SDDC operation. A life cycle of the second entity store 130 can be tied to a life cycle of the second VM 125, such that the states of both remain the same and both are located on the same host. In one example, the second entity store 130 does not persist if the second VM 125 no longer exists (e.g., if the VM 135 crashes, moves, or is decommissioned). An ID can be maintained in the second entity store 130 in a manner similar to that described above with reference to the first entity store 120.

The third entity store 145 can be used to store one or more states associated with the third VM 140. The same example types of states can apply to the third VM 140 and third entity store 145 as explained above with respect to the first and second VMs 115, 125 and entity stores 120, 130.

The hosts 110, 135 can execute using one or more corresponding physical processors and non-transitory memory. The memory can be implemented in various ways such as in the form of one or more memory devices mounted upon a printed circuit board located in the second host 135 or in the form of a distributed architecture that can include cloud storage components. The processor can access the memory to execute non-transitory instructions stored in the memory for implementing various operations of an SDDC node in the second host 135, the SDDC node including various elements such as a third VM 140 and a third entity store 145.

In response to a failure, the system can recover the SDDC, including restoring current states of all virtual components at the controller 105. For example, hardware that runs part of the SDDC can fail or one of the controllers 105 itself can crash. If this happens, a new controller 105 can be instantiated. States can initially be restored based on the last version of the controller database 150. However, this backup version may not have the most recent states of all components in the SDDC. To remedy this, the controller 105 can traverse the tree of virtual components and request states from the corresponding entity stores. To request states from entity stores, the controller can contact an agent on the host that is responsible for the corresponding virtual component, in an example. By keeping state information distributed in this manner, the controller 105 can be updated to current state information. Likewise, if a virtual component such as the first VM 115 fails, the controller can re-instantiate the first VM 115 using updated state information.

Figure 2A:
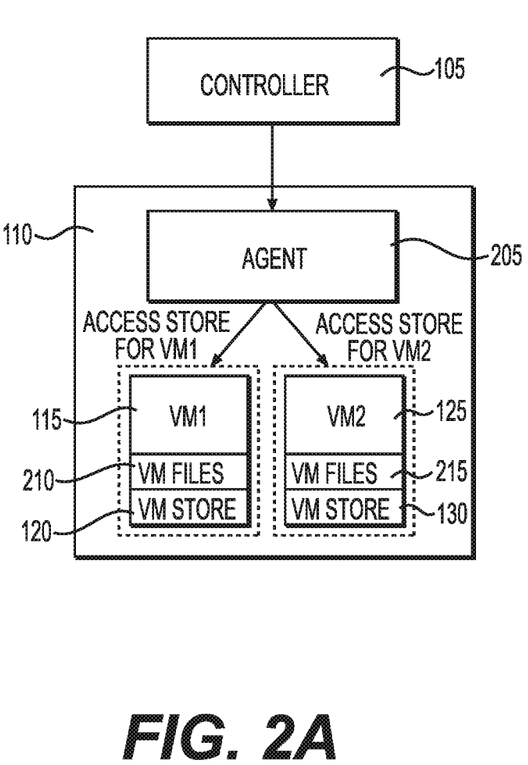
FIG. 2A is an illustration of example system components for backing up and restoring VMs on a host.

FIG. 2A is an illustration of some example components that can be used for implementing the system 100. In this example, the first host 110 is configured to include an agent 205. The agent 205 can be client software that is controlled in part by the controller 105. For example, the controller 105 can instruct the agent 205 to perform certain actions associated with the first VM 115 and the second VM 125. These actions can include generation of a first set of VM files 210. A file in the first set of VM files 210 can be used for example to encapsulate the first entity store 120 and the ID entity tag of the first entity store 120 prior to transporting the file to another host. The actions carried out by the agent 205 can further include generation of a second set of VM files 215. A file in the second set of VM files 215 can be used for example to encapsulate the second entity store 125 and the ID entity tag of the second entity store 125 prior to transporting the file to another host.

The components of FIG. 2A can be used in restoring VMs on a host. The controller 105 can communicate with the host 110 by sending and receiving application programming interface ("API") calls with an agent 205 that executes on the host 110. The agent can be software that assists the controller 105 in managing the virtual components on the host 110.

For example, the controller 105 can instruct the agent 205 to access an entity store 120, 130 for one of the VMs 115, 125. For example, the controller 105 can request a state, such as ID of the first VM 115, from the agent 205. The agent 205 can then access the first entity store 120 and return the value to the controller 105. Alternatively, the controller can request 105 all states of the first VM 115 and the controller 105 can access the first entity store 120, returning all of the states.

In one example, each time a state changes at the first VM 115, the agent 205 causes the state change to occur in the entity store 120. Then the controller 105 requests the updated state, which the agent 205 can access (at the first entity store 120) and return to the controller 105. This sequence can help ensure that the controller 105 always maintains the most recent state information. If the state change fails, for example, the entity store 120 may still contain the prior state and the controller 205 will not receive an updated state, causing no change to occur at the controller database 150.

The controller 105 can also request files 210, 215 from a VM 115, 125 in an example. The agent can handle such a request, returning the corresponding files 210, 215 to the controller 105 or to a client that communicates with the controller 105. For example, a client utilizing the second VM 125 can request a file. The controller 105 can relay this request to the agent 205, which in turn can request and return the requested file 215 from the second VM. In order to contact the correct VM 125, however, the controller 105 can utilize the ID that it retrieves and maintains from the second entity store 130. Without this ID, the agent 205 may not know which VM the controller 105 is attempting to access.

Figure 2B:
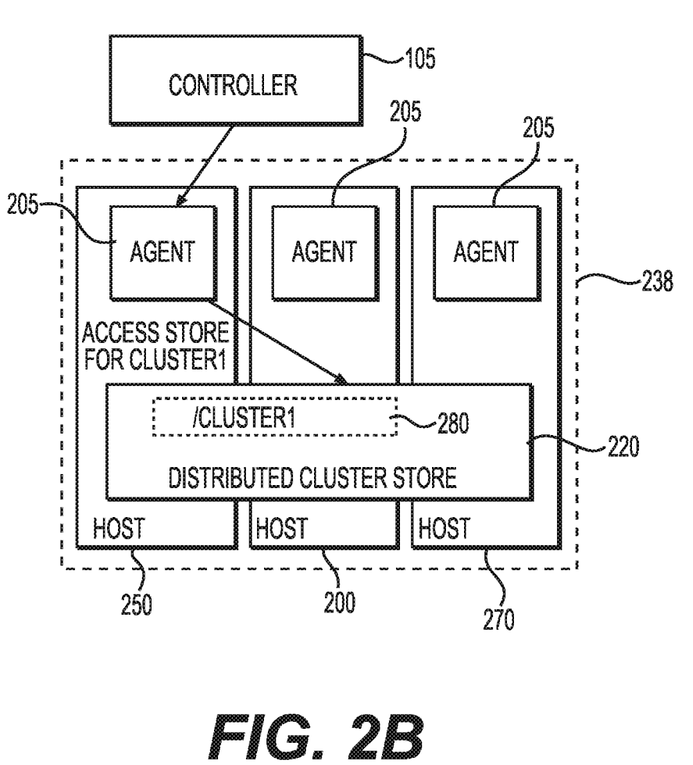
FIG. 2B is an illustration of example system components for backing up and restoring host information.

FIG. 2B is an example illustration of system components for determining which hosts are part of a cluster. In this example, multiple hosts 250, 260, 270 are illustrated that belong to a cluster 238. To ensure full state recovery at the controller 105, the controller 105 may need to determine which hosts 250, 260, 270 are part of the SDDC. Once this is determined, the controller 105 can requests VM state information from each host 250, 260, 270.

To track hosts in a distributed manner, each host 250, 260, 270 can access a distributed entity store 220, also called a distributed cluster store in this example. The distributed entity store 220 can include states of the cluster 238, including a host list 280. The host list 280 can include a list of all hosts 250, 260, 270 that belong to the cluster 238. This can allow the controller 105 to identify all hosts 250, 260, 270 even when the controller database 150 only identifies one of the hosts, such as host 250. This can be useful, for example, if a new host 270 is added to the cluster 238 after the last update to the controller database 150. For example, if the controller 105 crashes while the host 270 is being started or configured, the controller database 150 may not include that host 270.

The distributed entity store 220 can include other information as well. For example, it can track VM-VM affinity or anti-affinity so that the controller or other SDDC process can determine if two VMs can run together on the same host. The distributed entity store 220 can also specify multi-VM resource allocation, such as minimum and maximum CPU and memory that can be allocated to a group of VMs. The distributed entity store 220 can also include VM restart orchestration. This can specify which sequence VMs are restarted in when a host crashes and VMs are restarted elsewhere in the cluster.

In one example, each host 250, 260, 270 in the cluster 238 can maintain a synchronized copy of the distributed entity store 220. Alternatively, each host 250, 260, 270 can access the distributed entity store 220 at a location. If the distributed entity store 220 becomes corrupted, it can be rebuilt from local state information or another copy of the distributed entity store 220 of one or more of the hosts 250, 260, 270, in an example.

Each host 250, 260, 270 can execute a corresponding agent 205. The agent 205 can facilitate access to the distributed entity store 280 in similar fashion as described with regard to the agent 205 providing access to the VM entity stores 120, 130 in FIG. 2A. Once the controller is aware of the universe of hosts 250, 260, 270 in the SDDC, the host can request each host 250, 260, 270 to provide a VM list. The VM list can be provided by the agent 205 on that host 250, 260, 270, and can indicate which VMs are running on the respective host 250, 260, 270. From there, the controller 105 can request states of each VM 115, 125 as described for FIG. 2A. In this way, even when the controller database 150 is out of date, the states can be rebuilt back to current. This allows for successfully recovering the SDDC even when the controller 105 itself fails.

Figure 3:
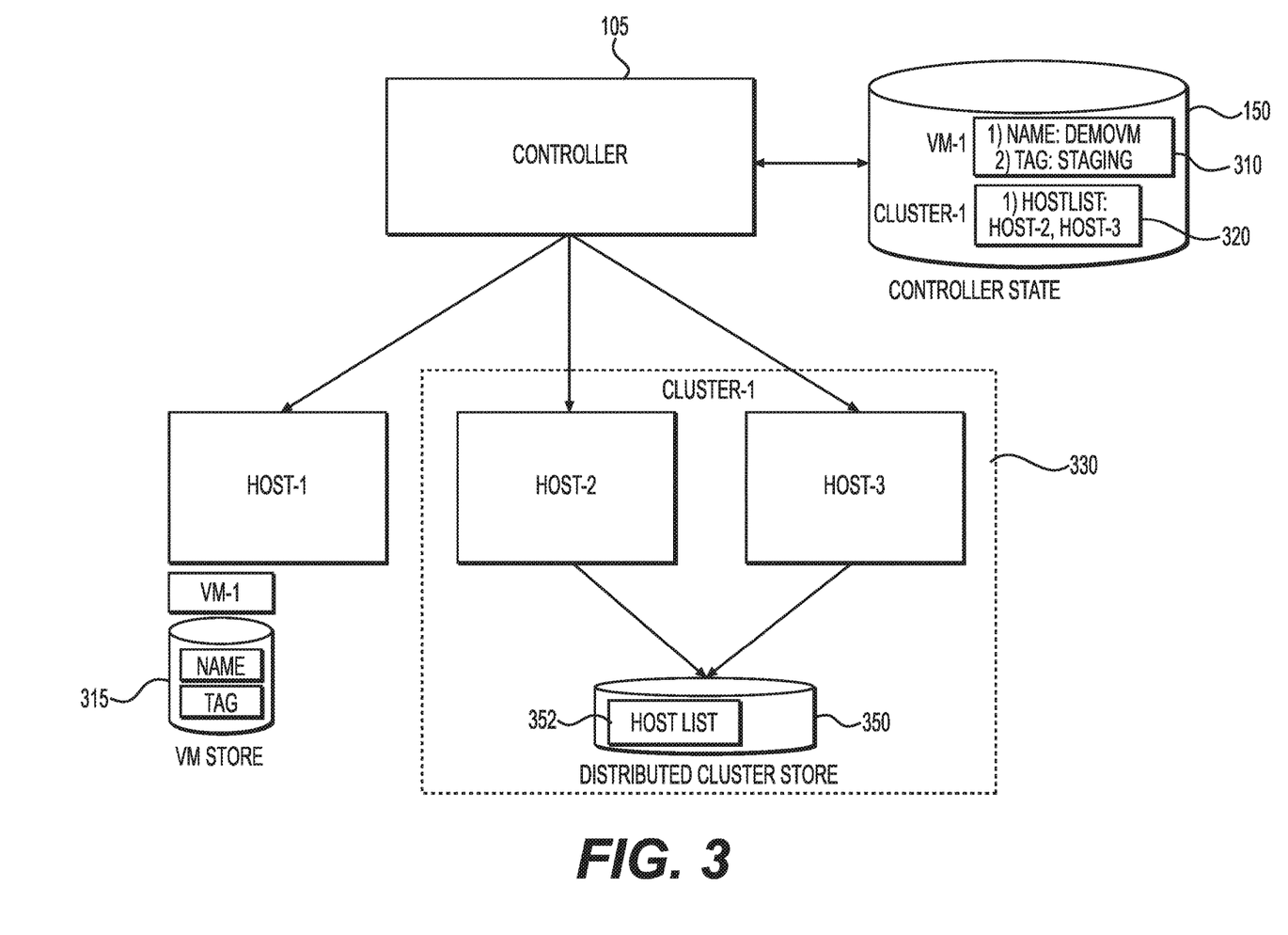
FIG. 3 is an illustration of an example system for backing up and restoring an SDDC.

FIG. 3 is another example illustration of system components. In this example, the controller can communicate with hosts on different clusters as part of the SDDC. For example, Host-1 can be executing in a different cluster than Host-2 and Host-3, which can operate together in the same cluster 330 (Cluster-1). The controller database 150 can track states of both VM-1 and Cluster-1. In this example, the controller has created VM-1 with the name "DemoVM" and a tag "Staging." The tag can represent a stage of operation of VM-1. Both the name and tag are states that can be persisted in the controller database 150 as entries 310. In one example, the system additionally persists the name and the tag in an entity store 315 that is attached to VM-1. As discussed previously, each VM can have its own entity store 315.

In this example, the controller 105 has also created a host list 352 for Cluster-1, which includes Host-2 and Host-3. The host list can be persisted in the controller database 150 as host list entries 320, which in this example identify Host-2 and Host-3. The host list can include all the hosts included in Cluster-1.

The host list 352 can also be stored in a distributed entity store 350. The distributed entity store 350 can be a distributed cluster store that runs on the group of hosts that are part of the cluster. In one example, a copy of the distributed cluster store can be stored on each host in the cluster (Cluster-1). Alternatively, the hosts can access one or more locations where the distributed cluster store is shared with the hosts. The distributed cluster store can also store other state information in addition to the host list 352. For example, the distributed entity store 350 can include status information of Cluster-1, such as how many hosts are part of Cluster-1, geographic location, and the like.

When the controller 105 fails, it can be recovered based on the distributed entity store 350. For example, the controller 105 can access the recovered host list from entries 320 and contact one of the hosts in the host list, such as Host-2. An agent operating on Host-2 can access the distributed entity store 350, which can contain the current host list 352. For example, Host-3 may not exist in the controller database 150 when controller 105 is recovered. But host list 352 can be accessed by Host-2 and identify Host-3 (or other hosts). With that information, controller 105 can contact Host-3. The agent at Host-3 can then identify VMs operating on Host-3. The controller 105 can then request states of those VMs, receiving the states from the agent at Host-3. All of the updated state information (e.g., the Cluster-1 host list, Host-3 states, and states of VMs on Host-3) can be stored in controller database 150.

The controller 105 and hosts have been described above. The cluster 330 (Cluster-1) can include any number of hosts. The controller 105 can access states of Cluster-1 in the distributed entity store 350 by communicating with any of the hosts, Host-2 or Host-3.

Figure 4:
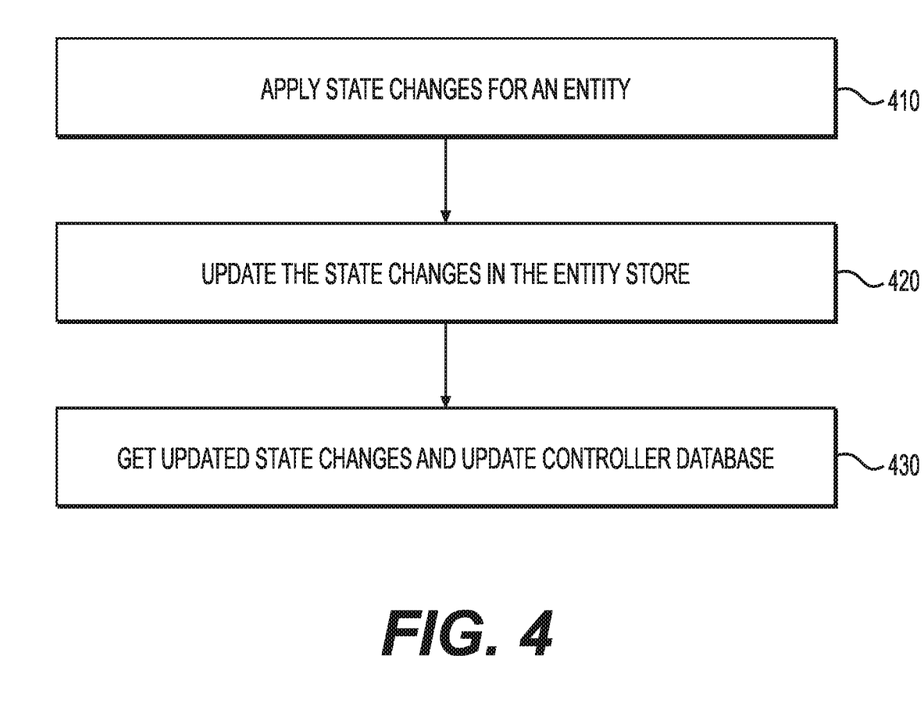
FIG. 4 is a flowchart of an example method for updating a controller state for an object in the SDDC.

FIG. 4 is an example method for updating an entity store and controller database 150. In one example, at stage 410, a virtual component can update its state. The virtual component can be a cluster, host, or VM, among other objects present in the SDDC. The state can be any attribute of the virtual component, such as an ID or tag representing operation status. In one example, the stage changes are applied at stage 410 based on receiving an instruction from a controller 105. For example, the controller can change the ID of a VM or cause the VM to be instantiated at a new location. Alternatively, the virtual component (e.g., VM or microservice) can change state on its own based on operations occurring at the entity itself. For example, a newly instantiated VM could have a tag that represents the VM is ready for use.

At stage 420, the agent on the host or the virtual component itself can update the corresponding entity store to reflect the state change. The entity store can be logically connected to the virtual component such that the agent or the virtual component can access the entity store. This can include utilizing API calls from the agent to the entity store, in an example.

At stage 430, the controller receives the updated state changes and updates the controller database. In one example, the controller communicates with the agent of the host, which accesses the state from the entity store. This can ensure that the entity store is updated before the controller receives the information. If the update does not complete, such as if the VM crashes, then the controller database 150 will not reflect the updated state, in an example. The VM can then be re-instantiated by the controller 105 at the last working state.

Figure 5:
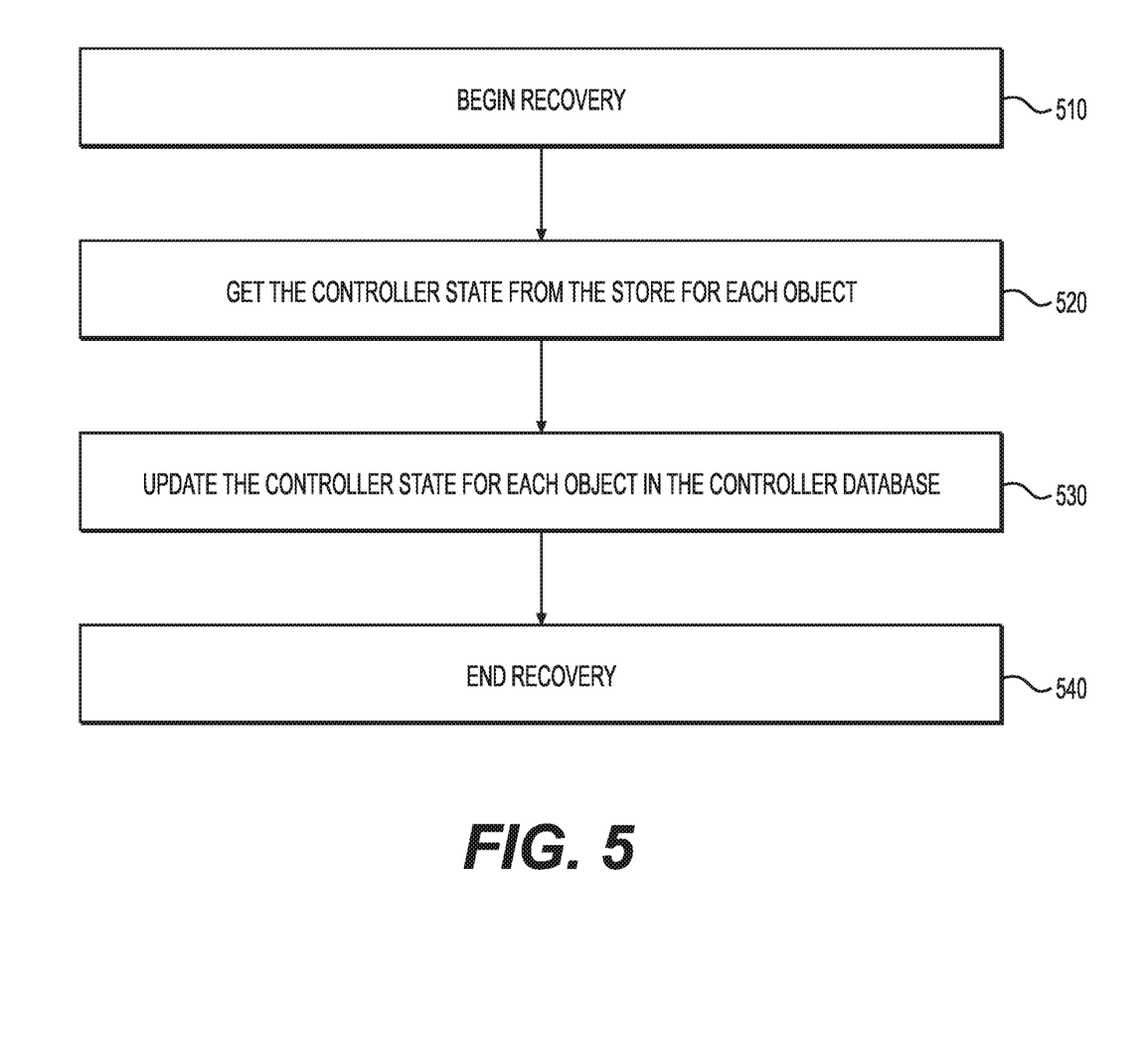
FIG. 5 is a flowchart of an example method for updating a controller state after restoring the controller from a backup.

FIG. 5 is an example method for recovering controller states after or as part of recovering from a backup. At stage 510, recovery of the controller 105 can begin. This can include restarting the controller 105 based on a backup. The backup can be based on the controller database 150. However, in order to recover the controller state that was created or modified after the backup, the entity stores for the various virtual components can be utilized.

In another example, the recovery phase can start with asking the user whether to take the controller database 150 contents as source-of-truth or instead take the entity store contents as the source of truth. The user can choose the entity store as the desired source-of-truth. However, the controller 105 can run as a VM as well and be dependent on virtual networks, in an example. If the entity store contains a network configuration that causes the controller 105 to be inaccessible, it is desired to use a DB back-up and let that contents update the entity-store.

In another example, a graphical user interface ("GUI") allows user interaction in the actual update. For example, the GUI can show state updates that will be made and asks the user to approve that list of updates. The GUI can show that state X in the controller database 150 or entity store will become state Y.

At stage 520, the controller can request states (e.g., IDs and tags indicating operational stages or attributes) from each virtual component. This can include querying the information from the entity stores associated with each virtual component. In one example, the controller 105 first queries distributed cluster stores to determine the universe of hosts in the SDDC. Then the controller 105 queries each host to determine the collection of VMs on each host. Then the controller 105 requests the states from each VM.

At stage 530, the controller 105 can then use the returned information (states) to update the controller database 150. Once all of the entity stores for the virtual components have been queried, the recovery can end at stage 540. This can help ensure that the controller state in the controller database 150 is the most current state. The controller can use the states to route client requests and other traffic to the correct SDDC components.

Figure 6:
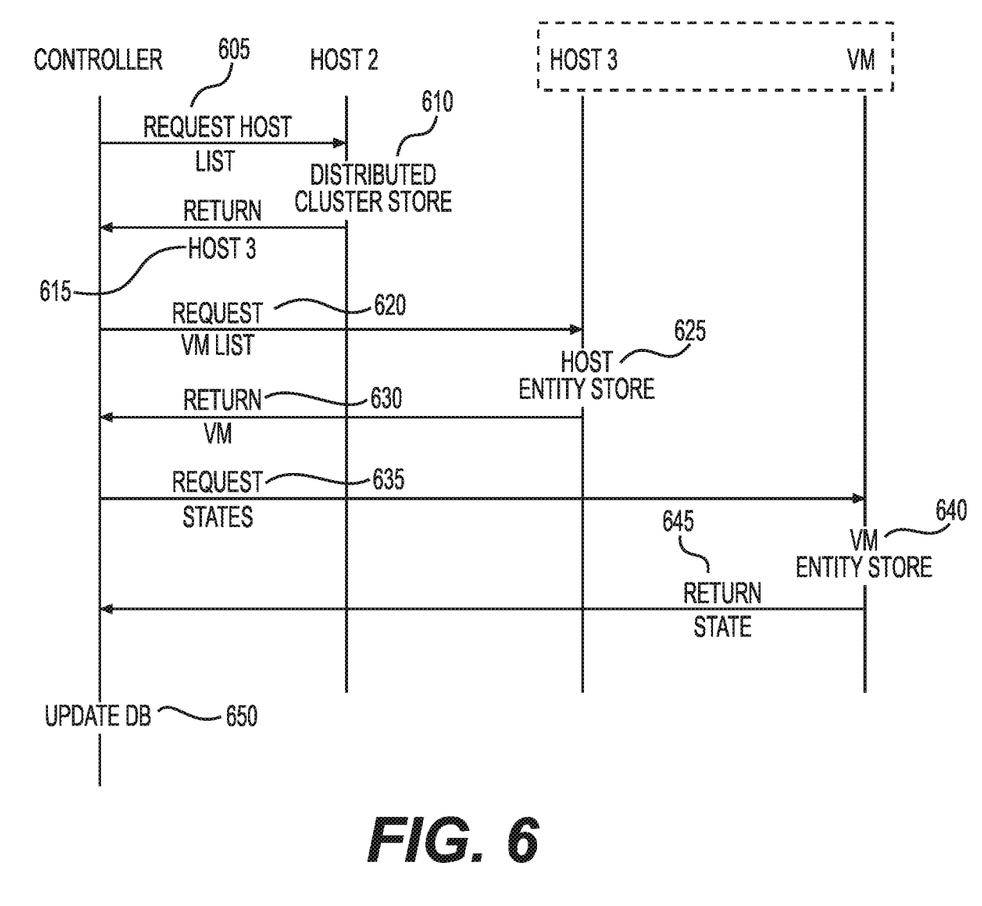
FIG. 6 is a sequence diagram with example stages for backing up and restoring an SDDC.

FIG. 6 is an example sequence diagram with stages for recovering the SDDC based on entity stores. In one example, the controller 105 can be restarted and initially set to use the last backed-up controller states from the last version of the controller database 150. In other words, the controller 105 can be re-instantiated or restarted and use the existing controller database 105 for initial restoration. Alternatively, the controller states can be updated from scratch or from the last version of the entity store based on the stages of FIG. 6.

At stage 605, the controller 105 can request a host list from host 2. The controller can identify host 2 in the controller database 150. However, checking the host list can allow confirmation that the controller database 150 contains all of the hosts that belong to the same cluster as host 2, in an example.

In one example, the controller 105 requests the host list by making an API call to host 2. The API call can be received by an agent that executes on host 2. The agent can be an application that runs as part of host 2. The agent can handle API calls, access one or more entity stores indicated by the API call, and return information to the controller 105. For example, the agent can access a distributed cluster store, a host store, or a VM store. Depending on the API call, different types of state information can be requested. This can include identifiers, names, operational states, and the like.

In response to an API call for a host list, at stage 610, host 2 can access a distributed cluster store. The host list can be stored as part of the distributed cluster store, which is one type of entity store. In one example, each host in the cluster can maintain a copy of the distributed cluster store, which can be synchronized at each update. This can allow any host to access the list of all hosts in the cluster. Alternatively, the host list can be stored as part of an entity store that is accessible by all of the hosts in the cluster. The distributed cluster store can include other information as well, such as geographic location information or operational load status.

At stage 615, host 2 can return the identity of host 3. This can be returned as part of a host list in one example. The controller 105 can check whether host 3 is identified in the host database 150. If not, then the controller 105 can add host 3 to the controller database.

The controller 105 can traverse the host list to request lists of VMs from each host to ensure that the controller database 150 is up to date, in an example. For example, at stage 620, the controller 105 can request a VM list from host 3. Again, this can include making an API call that is handled by an agent executing on host 3. The agent can access the co-existing entity store of host 3 and retrieve the VM list at stage 625. At stage 630, host 3 can return the identity of a VM that executes on host 3. In one example, this can include returning the VM identity as part of the VM list.

The controller 105 can then request states from the known VMs. At stage 635, the controller 105 can request the states of the VM identified at stage 630. The request can go to the VM or to host 3, depending on the example. For the purposes of this disclosure, requesting state information from a VM can include either contacting the host or the VM. In one example, the agent on the host can retrieve the states from the VM store 640, which is one type of entity store. The state information can include an ID, name, or descriptor of the VM. In one example, the state information includes the operational state of the VM.

At stage 650, the controller 105 can update the controller database 150 to include the state returned by host 3 or its VM at stage 645. This process can bring the controller states to current based on the distributed state information of the entity stores for the various SDDC components.

Figure 7:
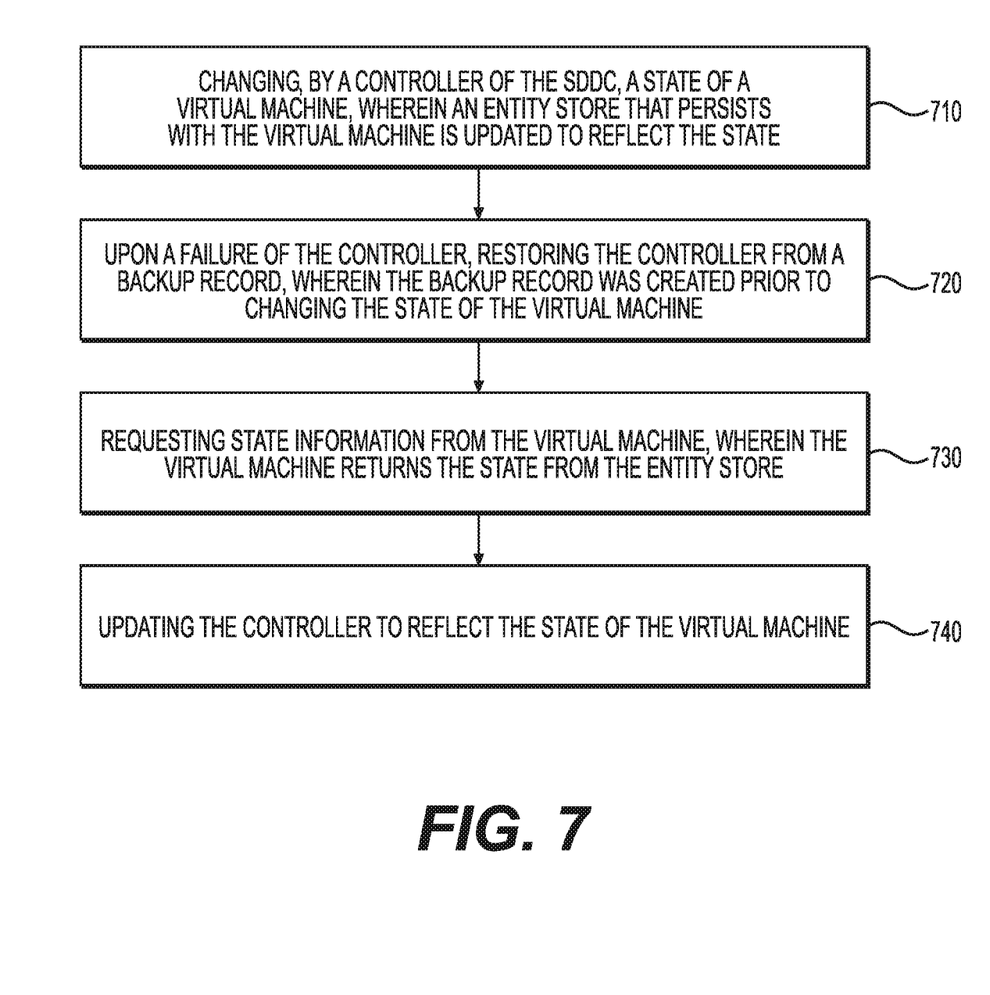
FIG. 7 is a flowchart for an example method for backing up and restoring an SDDC.

FIG. 7 is an example flowchart with stages for backing up and recovering an SDDC. At stage 710, the controller 105 can change the state of a VM. Alternatively, the controller 105 can change the state of a microservice or some other application. As has been explained, a state can include any descriptor of the VM (or other application), including an ID or name.

At stage 720, the controller 105 can be restored based on a backup record. For example, if the controller 105 fails, it can automatically be restarted in an example. The controller database 150 can be the backup record, containing states of the SDDC components prior to the controller 105 failing. However, if states of the SDDC components updated subsequent to the controller 105 failure, then the controller database 150 may lack some updated state information pertaining to one or more SDDC components. To remedy this, after restarting, the controller 105 can begin requesting state information from the SDDC components. This can include requesting a host list, a VM list from each host, and state information from each VM. For example, the controller can retrieve an initial list of hosts from the controller database 150. This can allow the controller 105 to then contact those hosts and get the current state from the cluster entity store. Based on the current state in the cluster entity store, the database 150 state can get updated. The controller 105 can then contact the hosts to retrieve VM lists and restore VM state information.

At stage 730, the controller 105 requests state information from the VM. The VM or host on which it resides can return the state information. The state information can be retrieved from an entity store that corresponds to the VM. The agent of the host can access the entity store or make an API call to the entity store in order to retrieve the state information.

At stage 740, the controller 105 can be updated to reflect the state of the virtual machine. This can include updating the host database 150 to include the retrieved state information. Repeating this process across SDDC components can bring the controller back to an updated state. This can allow the controller 105 to identify a virtual component, such as a VM, but the correct name or identifier and route traffic accordingly.

Figure 8:
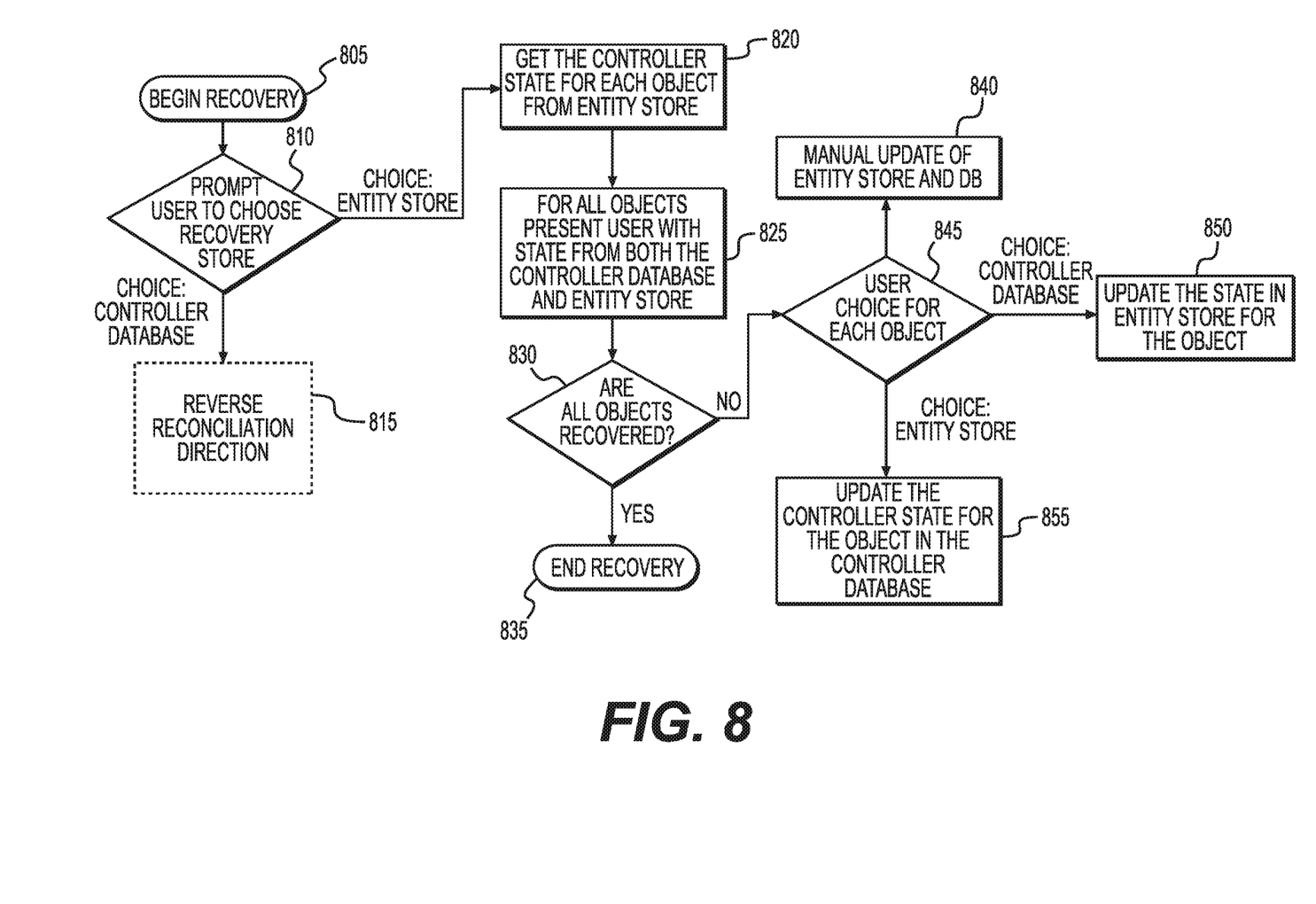
FIG. 8 is a flowchart for an example method for recovering an SDDC.

FIG. 8 is a flowchart with example steps for recovering an SDDC. At stage 805, the recovery can begin. This can be in response to a failure of a controller or some other virtual component, such as a host or VM. The failure of the virtual component can include failure of the corresponding entity store, in an example.

In one example, an administrative console can include a GUI to allow an administrative user to make decisions regarding the SDDC restoration. At stage 810, the GUI can be displayed that prompts the user regarding how to reconcile different states between the controller database 150 and the entity stores of the various virtual components. For example, the user can be prompted regarding whether to use the controller database 150 to restore entity stores or instead use entity stores to restore the controller database 150. This can set the direction with which reconciliation takes place between the entity stores and the controller database 150. As explained above, each virtual object of the SDDC can have a respective entity store that includes state information (also called "states") about the virtual object. The state information can include attributes related to sizing, memory, placement constraints, and identity of the virtual object. The controller database 150 can include the state information also. Therefore, at stage 810, the GUI can allow the user to choose the direction with which to replicate the state information. The reconciliation can then proceed in that direction.

The stages in FIG. 8 after stage 810 generally pertain to reconciling the controller database 150 based on the values in the entity stores. But these same steps can be performed to instead reconcile entity store states based on the states of the controller database 150 based on the user instead choosing to restore from the controller database 150 at stage 810. If the user chooses to restore from the controller database 150, then at stage 815 the controller can reverse the direction with which changes are applied. For the other stages in FIG. 8, instead of updating the controller database 150 with the state information from each object's entity store, the controller database 150 can supply state information to the entity stores. This can still involve traversing the hierarchy of objects, which can include controllers, clusters, hosts, and VMs.

If the user chooses to restore from the entity store at stage 810, then at stage 820 the controller can get the state information for each object from that object's respective entity store. This can include looping through the hierarchy of objects, in an example. For example, the controller 105 can retrieve a list of hosts from the shared cluster store. Then, for each host, the controller 105 can retrieve a list of virtual objects (e.g., VMs) that the host is responsible for. Then the controller 105 can receive the states of the entity stores corresponding to those virtual objects.

At stage 825, the GUI can present the user with the state from both the controller database 150 and the entity stores of the virtual objects. These states can be presented side-by-side, in an example, such that the administrative user can see differences between the controller database 150 and the entity stores. In one example, only the entries that are different get displayed. This can allow the administrative user to preview what the changes made during recovery will be. This can also allow the administrative user to spot anomalies that may be present based on the recovery process. In an alternate example, this side-by-side display only shows which values were actually changed based on the selection of stage 810, and further user input prior to reconciling the controller database 150 and entity stores is not requested or needed.

In one example, at stage 830, the controller 105 can determine whether all objects are recovered. This can be the case when both the controller database 150 and entity stores have the same state information. Additionally, the controller can confirm that all of the virtual objects are represented in the controller database 150, such as by determining no other virtual objects are listed by the hosts of the cluster. If the objects are all recovered, then at stage 835 recovery can end and the SDDC can continue operating normally.

If the recovery is not complete, then the GUI can prompt the user regarding whether they are sure they want to restore in the direction previously selected. In one example, at stage 845, the GUI can allow the user to confirm or change how the entity stores and controller database 150 will be reconciled. This can be done displaying the side-by-side differences in values for various objects at stage 825, in one example. For example, the GUI can indicate the direction in which the reconciliation will take place if the user confirms. This can be based on the user's selection from stage 810 (e.g., to restore from the entity stores to the controller database 150). The user can then select to either: (1) restore in the direction already selected at stage 810, (2) change the restoration direction (e.g., to restore instead from the controller database 150 to the entity stores), or (3) to provide manual values for one or more unreconciled states.

If the user elects manual entry, such as by clicking on one of the state values displayed on the GUI, the user can type in new state information in an example at stage 840. This can cause the controller 105 to set state information at the corresponding entity store or at the controller database 150. In one example, the user can select whether to continue to restore in the direction selected at stage 810 or to reverse direction. If the user selects to restore from the entity stores, then at stage 855, the controller 105 can update the controller database 150 to reflect the states of the entity stores. If the user selects to restore from the controller database 150, then at stage 850 the entity stores are updated based on the states (also called "state information") in the controller database 150.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for restoring a Software-Defined Data Center ("SDDC"), comprising:
    changing, by a controller of the SDDC, a state of a virtual machine, wherein the virtual machine updates an entity store to include the state, wherein the entity store persists with the virtual machine to reflect the state, wherein the entity store corresponds to the virtual machine;
    upon a failure of the controller, restoring the controller from a backup record, wherein the backup record was created prior to changing the state of the virtual machine;
    requesting a list of virtual machines from a host, the list including the virtual machine;
    determining that the virtual machine is included in the list but-is not reflected in the backup record;
    requesting, by the controller, state information from the virtual machine, wherein the state from the entity store is returned to the controller; and
    updating the controller to reflect the virtual machine and the state of the entity store when the backup record does not include the virtual machine or includes an unchanged state that is different from the state of the entity store.

2. The method of claim 1, wherein the state is one of an identifiers of the virtual machine and a name of the virtual machine.

3. The method of claim 1, wherein changing the state includes:
    updating the entity store that corresponds to the virtual machine;
    receiving the state at the controller from the virtual machine; and
    updating a controller database to include the state.

4. The method of claim 1, wherein the controller identifies the host by retrieving a list of hosts for a cluster from a distributed cluster store.

5. The method of claim 4, wherein a copy of the distributed cluster store is stored on multiple hosts that belong to the cluster.

6. The method of claim 1, wherein the backup record is a current version of a controller database, and wherein updating the controller to reflect the state of the virtual machine includes adding the state of the virtual machine to the controller database.

7. A non-transitory, computer-readable medium comprising instructions that, when executed by a processor, cause the processor to perform stages for backing up and recovering a software-defined data center ("SDDC"), the stages comprising:
    changing, by a controller of the SDDC, a state of a virtual machine, wherein the virtual machine updates an entity store to include the state, wherein the entity store corresponds to the virtual machine and persists with the virtual machine to reflect the state;
    upon a failure of the controller, restoring the controller from a backup record, wherein the backup record was created prior to changing the state of the virtual machine;
    requesting a list of virtual machines from a host, wherein the list includes the virtual machine; and
    when the virtual machine is not reflected in the backup record, updating the controller to include the virtual machine and the state of the virtual machine, wherein the state of the virtual machine is returned to the controller from the entity store.

8. The non-transitory, computer-readable medium of claim 7, wherein the state is one of an identifier of the virtual machine and a name of the virtual machine.

9. The non-transitory, computer-readable medium of claim 7, wherein changing the state includes:
    updating the entity store that corresponds to the virtual machine;
    receiving the state at the controller from the virtual machine; and
    updating a controller database to include the state.

10. The non-transitory, computer-readable medium of claim 7, wherein the controller identifies the host by retrieving a list of hosts for a cluster from a distributed cluster store.

11. The non-transitory, computer-readable medium of claim 10, wherein a copy of the distributed cluster store is stored on multiple hosts that belong to the cluster.

12. The non-transitory, computer-readable medium of claim 7, wherein the backup record is a current version of a controller database, and wherein updating the controller to reflect the state of the virtual machine includes adding the state of the virtual machine to the controller database.

13. A system for backing up and recovering a software-defined data center ("SDDC"), comprising:
    a non-transitory, computer-readable medium containing instructions; and
    a processor that executes the monitoring module to perform stages comprising:
        changing, by a controller of the SDDC, a state of a virtual machine, wherein the virtual machine updates an entity store to include the changed state, and wherein the entity store persists with the virtual machine to reflect the state;
        upon a failure of the controller, restoring the controller from a backup record of a controller database;
        receiving a list of virtual machines from a host, wherein the list includes the-virtual machine; and
        when the backup record does not include the virtual machine, updating the controller database to include the virtual machine and the state of the virtual machine, wherein the state of the virtual machine is retrieved from the entity store.

14. The system of claim 13, wherein the state is one of an identifier of the virtual machine and a name of the virtual machine.

15. The system of claim 13, wherein changing the state includes:

updating the entity store that corresponds to the virtual machine to include the changed state;

receiving the changed state at the controller from the virtual machine; and updating the controller database to include the changed state.

16. The system of claim 13, wherein the controller identifies the host by retrieving a list of hosts for a cluster from a distributed cluster store.

17. The system of claim 16, wherein a copy of the distributed cluster store is stored on multiple hosts that belong to the cluster.

* * * * *